(12) United States Patent
Manwiller et al.

(10) Patent No.: US 10,931,665 B1
(45) Date of Patent: *Feb. 23, 2021

(54) CROSS-DEVICE USER IDENTIFICATION AND CONTENT ACCESS CONTROL USING COOKIE STITCHERS

(71) Applicant: WALGREEN CO., Deerfield, IL (US)

(72) Inventors: Peter Manwiller, Chicago, IL (US); Adam Crouch, Chicago, IL (US)

(73) Assignee: WALGREEN CO., Deerfield, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/510,232

(22) Filed: Jul. 12, 2019

Related U.S. Application Data (63) Continuation of application No. 15/652,889, filed on Jul. 18, 2017, now Pat. No. 10,440,009.

(51) Int. Cl.
*H04L 29/06* (2006.01)
*G06Q 30/02* (2012.01)

(52) U.S. Cl.
CPC ............ *H04L 63/083* (2013.01); *H04L 63/10* (2013.01); *G06Q 30/0226* (2013.01)

(58) Field of Classification Search
CPC .................................................... H04L 63/083
See application file for complete search history.

(56) References Cited

U.S. PATENT DOCUMENTS

| | | | | |
|---|---|---|---|---|
| 7,137,141 B1* | 11/2006 | McClanahan | ........... | G06F 21/41 726/8 |
| 7,433,956 B2* | 10/2008 | Zhao | ....................... | H04L 29/06 709/227 |
| 8,359,332 B1* | 1/2013 | Diamond | ................ | G06F 21/10 707/781 |
| 8,782,394 B2* | 7/2014 | O'Neil | .................. | H04L 63/083 380/270 |
| 8,799,765 B1* | 8/2014 | MacInnis | .............. | G06F 40/169 715/230 |
| 9,728,107 B1* | 8/2017 | Begen | ...................... | G09F 3/00 |
| 10,216,977 B2* | 2/2019 | Tse | ..................... | G06K 9/00087 |
| 2009/0076966 A1* | 3/2009 | Bishop | .................. | G07F 7/0866 705/67 |
| 2011/0288940 A1* | 11/2011 | Horadan | ............ | G06Q 30/0273 705/14.69 |

(Continued)

*Primary Examiner* — Shawnchoy Rahman
(74) *Attorney, Agent, or Firm* — Marshall, Gerstein & Borun LLP; Randall G. Reuth (57) ABSTRACT

Techniques are disclosed to leverage third party "cookie stitchers" for cross-device user identification, which may be used by a network server to selectively provide content to a user. The techniques include a cookie stitcher associating a user with multiple computing devices, which in turn notifies the network server when the same user requests access to provided content on separate occasions from different computing devices. The cookie stitcher may also have access to a user record regarding the identified user, and may provide this record data to the network server to identify other characteristics about the user. Based upon the particular type of information that is identified, the network server may provide varying degrees of access to content and/or allow the user to interact with one or more applications supported by the network server in different ways.

17 Claims, 5 Drawing Sheets

(56) References Cited

U.S. PATENT DOCUMENTS

| | | | |
|---|---|---|---|
| 2012/0066047 A1* | 3/2012 | Muthugopalakrishnan | ................. G06Q 20/387 705/14.26 |
| 2016/0253710 A1* | 9/2016 | Publicover | .......... G06F 16/2358 705/14.66 |
| 2017/0004533 A1* | 1/2017 | Boal | .................. G06Q 30/0241 |
| 2017/0154366 A1* | 6/2017 | Turgeman | .......... G06Q 30/0277 |
| 2017/0214756 A1* | 7/2017 | Lipka | ..................... H04L 67/02 |

\* cited by examiner

CROSS-DEVICE USER IDENTIFICATION AND CONTENT ACCESS CONTROL USING COOKIE STITCHERS

CROSS-REFERENCE TO RELATED APPLICATION

The present application is a continuation of U.S. patent application Ser. No. 15/652,889, entitled CROSS-DEVICE USER IDENTIFICATION AND CONTENT ACCESS CONTROL USING COOKIE STITCHERS, filed Jul. 18, 2017, the disclosure of which is incorporated herein in its entirety by reference.

TECHNICAL FIELD

The present disclosure relates generally to cross-device user identification and, more particularly, to utilizing cookie stitchers to identify and selectively provide content to users as they request access to hosted content from different computing devices.

BACKGROUND

Traditionally, retailers may allow users to access sensitive hosted content upon receiving the appropriate authenticating information, such as credit card numbers, purchase history, etc. However, this sensitive information may only be accessed when a user is signed-in and, requiring a signed-off user to re-enter the authenticating information to access the sensitive information. Thus, retailers have designed their websites with the ability to recognize users after being logged off by placing an encrypted cookie on the user's computing device via a web browser. This cookie may be then used to later identify the user from the same computing device to provide access to certain types of insensitive information (e.g., items previously stored in the user's virtual shopping cart), without requiring the user to re-enter his authenticating information. A user would still need to enter his authentication information, however, to complete a transaction or to otherwise access information that is deemed sensitive in nature.

Although the use of encrypted cookies allows websites to recognize users after being logged out of a particular session, conventional systems are limited to recognizing the cookie stored locally on the computing device, and only if the user has set his browser security settings to allow this activity. Conventional systems have no way of recognizing that same user when browsing the website from another computing device, and thus require users to re-enter authenticating information from each new, unrecognized computing device. Because various retailer website functionalities rely on adequately identifying each user, conventional systems have several drawbacks by failing to do so.

SUMMARY

Various embodiments are described herein that leverage third party "cookie stitchers" for cross-device user identification, which may be used by a network server to selectively provide content. The embodiments include a cookie stitching server accessing user records that correlates users to their respective sets of computing devices, and notifying a network server (which hosts website content) when the same user requests access to hosted content on separate occasions from different computing devices. The user record may also contain other data regarding the identified user, which the network server may utilize to identify other characteristics about the user. Based upon the particular type of information that is identified for a particular user, the network server may provide varying degrees of access to content and/or allow the user to interact with one or more applications supported by the network server in different ways.

In some embodiments, a network server may automatically transition to a third, "intermediate" state in which the user is allowed access to insensitive information without providing authentication information, but not sensitive information. This intermediate state is one in which the user is neither signed-in nor signed-out to a web session. For example, a user may initially access a website hosted by the network server from a first computing device and then be logged out due to inactivity. Upon accessing the same website from a second computing device, the cookie stitcher may determine that the user is associated with both the first and the second computing device from the user record, notify the network server that this user previously visited the website from another computing device, and provide the network server with the user record. The network server may then access data contained in the user record to determine various identifiers associated with the user, such as website identifiers and/or account identifiers. If a website identifier is found it the user record, the network server may allow the user access to insensitive information from the second device without the user providing any authenticating information. In other words, the network server may provide the user with access to hosted content in a similar manner as if the user were logged out of the website, via the first computing device but continued to browse the website.

In other embodiments, the cookie stitcher may identify that the user is associated with both the first and the second computing device, but the user record may not contain a website identifier. In such a case, the intermediate state may not be an option, but other applications may still be made available to the user without providing any authenticating information via the second computing device. For instance, the user record may include other information such as account identifiers (e.g., for loyalty rewards programs). Upon identifying a user's account identifier, a user may interact with the website to clip digital coupons (i.e., store or otherwise associate the digital coupons with the user's loyalty rewards account) or perform other activities that would otherwise require the user to manually enter this information.

In still other embodiments, the user record may not contain a website identifier or an account identifier. In such a case, the intermediate state and the aforementioned applications may not be made available to the user, but information obtained from the user record may still be used for other purposes. For instance, the user record may contain other information, such as demographic information, that the network server may use to pre-fill form fields. In this way, even when a user initially visits a website, the cookie stitcher may allow the network server to provide some initial conveniences for the user until the user completes a registration process, which may generate the aforementioned website identifier and/or account identifier. And, once the website identifier and/or account identifier are created, this may be added to the user record such that the user may subsequently be recognized as discussed above, regardless of the particular computing device from which the user accesses the website.

BRIEF DESCRIPTION OF THE DRAWINGS

The Figures described below depict various aspects of the system and methods disclosed herein. It should be understood that each figure depicts an embodiment of a particular aspect of the disclosed system and methods, and that each of the figures is intended to accord with a possible embodiment thereof. Further, whenever possible, the following description refers to the reference numerals included in the following figures, in which features depicted in multiple figures are designated with consistent reference numerals.

DETAILED DESCRIPTION

The following text sets forth a detailed description of numerous different embodiments. However, it should be understood that the detailed description is to be construed as exemplary only and does not describe every possible embodiment since describing every possible embodiment would be impractical. One of ordinary skill in the art will recognize, in light of the teaching and disclosure herein, that numerous alternative embodiments could be implemented.

It should be understood that, unless a term is expressly defined in this patent application using the sentence "As used herein, the term '________' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent application.

Figure 1:
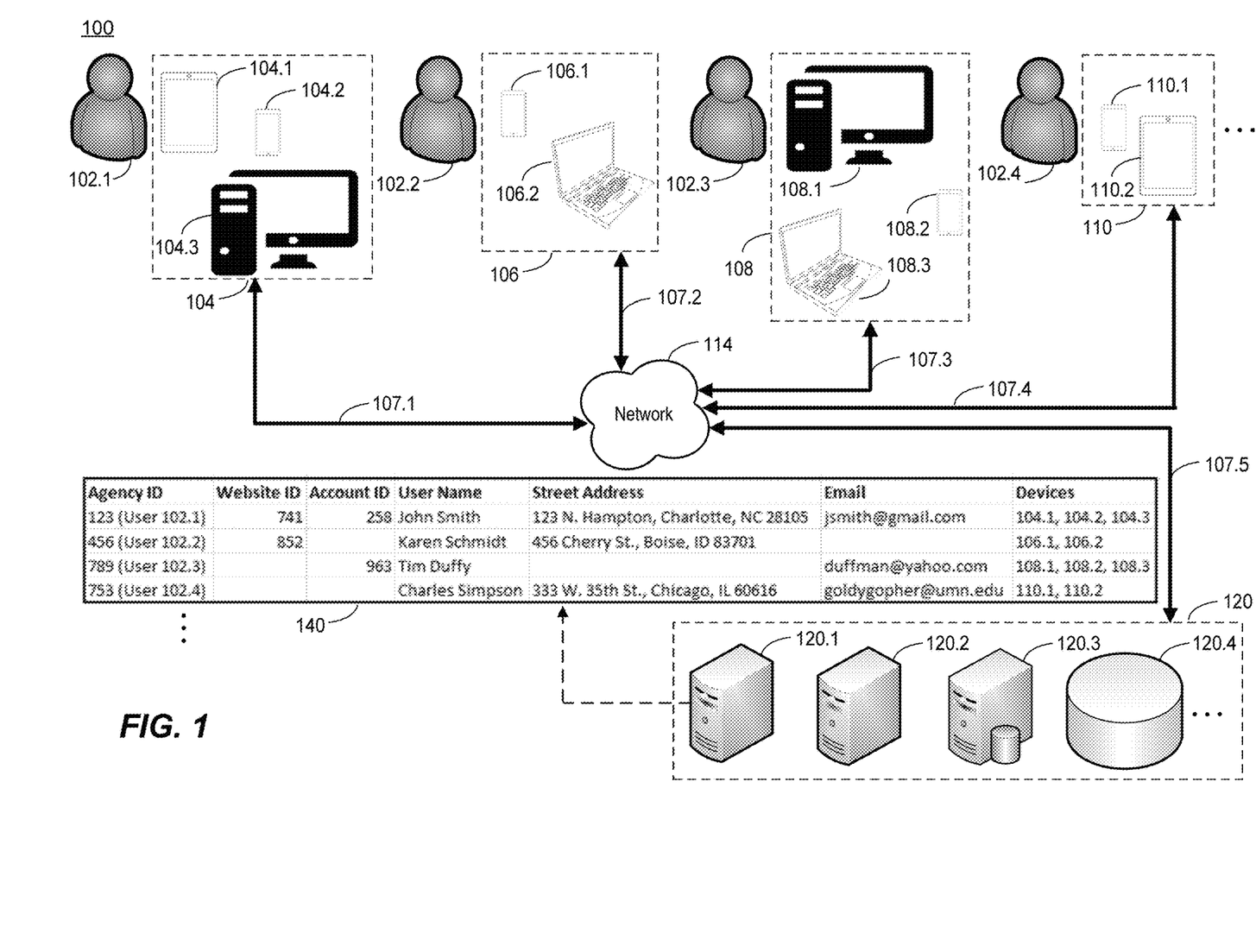
FIG. 1 is a block diagram of an example cross-device user identification system 100, in accordance with embodiments of the present disclosure.

FIG. 1 is a block diagram of an example cross-device user identification system 100, in accordance with embodiments of the present disclosure. In an embodiment, cross-device user identification system 100 ("system 100") may include any suitable number N of users 102.1-102.N, four being shown in FIG. 1 (users 102.1-102.4), and each of these users 102.1-102.4 being associated with a set of computing devices 104, 106, 108, and 110, respectively. System 100 may also include a communication network 114 and one or more back-end components 120. System 100 may include additional, fewer, or alternate components, including those discussed elsewhere herein.

For the sake of brevity, system 100 is illustrated as including only 4 users 102.1-102.4. Furthermore, system 100 is illustrated as including a single communication network 114, a set of four back-end components 120, etc. However, the embodiments described herein may include any suitable number of the components illustrated in FIG. 1 and/or elsewhere as discussed herein. For example, the system 100 may support several hundred users 102, each being associated with any suitable number of computing devices. Moreover, the back-end components 120 may communicate with one or more of the computing devices 104, 106, 108, and/or 110, via communication network 114 to receive requests for access to hosted content, websites, applications, etc., provided by and/or otherwise supported by the back-end components 120, as further discussed herein.

Communication network 114 may be configured to facilitate communications between one or more of each user's computing devices 104, 106, 108, and/or 110, and/or one or more back-end components 120, using any suitable number of wired and/or wireless links. Communication network 114 may support communications between these various components in accordance with any suitable number and/or type of communication protocols, which may be the same or different communication protocols based upon the particular components for which communication is being supported. These wired and/or wireless links may be represented in FIG. 1 as links 107.1-107.5, for example, for ease of explanation, although it will be understood that each computing device (e.g., computing device 104.1-104.3, 106.1-106.2, 108.1-108.3, and/or 110.1-110.2, etc., which may alternatively be referred to herein as "computing devices") may individually communicate with one or more backend components 120 via communication network 114. To support such communications, communication network 114 may include any suitable number of nodes, additional wired and/or wireless networks, etc., in various embodiments.

For example, in an embodiment, communication network 114 may be implemented as a local area network (LAN), a metropolitan area network (MAN), a wide area network (WAN), or any suitable combination of local and/or external network connections. To provide further examples, communications network 114 may include wired telephone and cable hardware, satellite, cellular phone communication networks, femtocells, access points, macrocells, etc. In an embodiment, communication network 114 may provide one or more computing devices and/or one or more back-end components 120 with connectivity to network services, such as Internet services, for example, and/or support application programming interface (API) calls between one or more computing devices and/or one or more back-end components 120.

To this end, one or more computing devices and/or one or more back-end components 120 may be configured to communicate with one another via communication network 114 using any suitable number and/or type of communication protocols, such as Wi-Fi, cellular, BLUETOOTH, NFC, RFID, Internet communications, etc., or any combination thereof. For example, computing device 104.2 may be configured to communicate with the Internet and/or one or more backend components 120 via communication network 114 using cellular communications to send data to and/or receive data from one or more back-end components 120 using links 107.1 and 107.5. To provide another example, computing device 108.1 may be configured to communicate with one or more back-end components 120 via a wired Internet protocol using links 107.3 and 107.5.

In various embodiments, the computing devices may be implemented as any suitable type of computing and/or client device, such as a smartphone, a personal digital assistant (PDA), a tablet computer, a laptop computer, a desktop computer, a thin client laptop, a wearable electronic device, etc. As further discussed below, one or more of the users 102.1-102.4 may use any one of their respective computing devices to access the Internet and navigate to various websites, one or more of which may be associated with a particular retailer that is hosted by one or more of back-end computing devices 120. In doing so, a user may browse a retailer's website to perform various activities based upon the nature of the retailer. For instance, a user may navigate the retailer's website to browse and purchase items, to register for various programs (e.g., loyalty rewards programs, which may result in a unique account number being generated and associated with that particular user), to request prescription refills, to view the status of prescription refills, to provide a preferred pickup location for purchased products (including prescription refills), etc.

Additionally or alternatively, a user may browse a retailer's website to register with the retailer and/or to create a user profile for a particular retailer, which may result in a unique website identifier ("Website ID") being generated and associated with that particular user. The Website ID may allow a user to be recognized by one or more of the back-end computing devices 120 to recognize a user when navigating a retailer's website to match a user with her user profile data as well as other information associated with the user. This Website ID may include, for example, any suitable type of unique identifier such as a numeric code. To provide an illustrative example, upon browsing the retailer's website, a user may be prompted to enter login information and/or complete an initial registration process to create a user profile, whereby the user provides information such as contact information, demographic information, payment information, etc. Additionally or alternatively, the user may initially create a user profile over the phone, via the postal service, via a specialized retailer application installed on the particular computing device (e.g., an application installed on a mobile computing device), etc.

Once created, the Website ID may allow a retailer's website to link a user to sensitive and insensitive types of information. Sensitive information may include, for example, payment information, prescription information or other health-related information that may be protected by the Health Insurance Portability and Accountability Act of 1996 (HIPPA), etc. Insensitive information may include, for example, the user's name, contact information, demographic information, etc. Furthermore, the retailer's website may store other types of information, which may be classified as insensitive or sensitive, during a particular web-browsing session. For example, the retailer's website may save products selected by a user to a wish list, or products added to a cart, as insensitive information, but any payment information entered during a session may be classified as sensitive information. The retailer's website may provide varying levels of access to this information based upon a user's particular authentication state (e.g., signed-in, signed-out, or intermediate) when attempting to perform certain activities via the website. As further discussed below, the particular authentication state may be based upon various conditions such as whether the user has provided proper authenticating information (e.g., a username and password), whether the session has timed out, and the type of information contained in a user's record as identified by the cookie stitcher. Of course, the retailer's website may provide users with access to generic content that is available to all users, regardless of whether the user has a Website ID, such as information that is typically associated with any user browsing the website including store locations and hours, current promotions, etc.

Additionally or alternatively, a user may browse a retailer's website to register for other types of products or services that may not result in a Website ID being created. For example, a user may register for a loyalty rewards account as a separate process from the website user registration discussed above. Therefore, a user may interact with the website to provide less (or different types of) information than would be required for website registration. Again, upon being created, the retailer may assign an account identifier ("Account ID") based upon the particular type of product or service for which the user registered. For example, if the user registered for a loyalty rewards program, this identifier may include a unique account identifier such as a loyalty rewards ID or an account number associated with this program. Again, the user may initially register for this program and/or service in different ways other than via a website, such as over the phone, via the postal service, via a specialized retailer application installed on the particular computing device (e.g., an application installed on a mobile computing device), etc.

To support the various website functionalities as discussed herein, the back-end components 120 may include one or more external components such as a cookie stitching server 120.1, a network server 120.2, a database server 120.3, and/or a database 120.4. Again, although FIG. 1 illustrates one or more back-end components 120 as including only four different types of back-end components, embodiments include one or more back-end components 120 implementing any suitable number and/or type of back-end components to facilitate the appropriate functions of the embodiments as described herein. The one or more back-end components 120 may be configured to receive data from and/or send data to one or more computing devices via communication network 114 using any suitable number of wired and/or wireless links. In various embodiments, one or more back-end components 120 may be configured to execute one or more applications, to support one or more applications executed on the computing devices, to host, provide, and/or support content for one or more retailer websites, and/or to perform one or more functions associated with the embodiments as discussed herein.

In various embodiments, cookie stitching server 120.1 may be implemented as any suitable number of servers configured to facilitate Internet communications, to communicate with the other back-end components 120 and/or computing devices (e.g., computing devices 104, 106, 108, and 110), and to facilitate the cross-device identification of individual users. In various embodiments, the cookie stitching server 120.1 may be configured to store or otherwise access a user record for several users to identify each user in terms of a unique "Agency ID," which is illustrated in FIG. 1 as user record data 140. Although the user record data 140 shown in FIG. 1 only includes information for each of the users 102.1-102.4 for purposes of brevity, embodiments include the user record data 140 including a user record for several hundred, thousand, million, etc., of different users. Furthermore, the user record data 140 may include additional, fewer, or alternate information than that shown in FIG. 1.

For example, the cookie stitching server 120.1 may be implemented as one or more servers, computing devices, etc., that harvests data from one or more computing devices over time using several data sources to build a user record for each user. In an embodiment, the cookie stitching server 120.1 may be implemented as a third-party server configured to provide cross-device user identification in accordance with marketing or advertising purposes, and is separate from the retailer network server 120.2, which may function as a web server to provide hosted content. For example, the cookie stitching server 120.1 may purchase data provided by various suppliers, analyze web traffic, and/or communicate with other computing devices to collect cookie data, browsing data, unique device identifier data, contact information, demographic information, etc., associated with one or more users. By analyzing this pool of data over time, the cookie stitching server 120.1 may correlate each user with their respective computing devices and/or other information to build user records, as shown in FIG. 1.

Embodiments include the cookie stitching server 120.1 being configured to communicate with the retailer web network server 120.1 and/or other back-end components 120 in various ways to support the functionality of the embodiments as described herein. For example, the cookie stitching server 120.1 may periodically communicate with the network server 120.2, database server 120.3, and/or database 102.4 to update each user's record as additional data becomes available (e.g., when a new Website ID and/or Account ID is generated for a particular user, when new or updated demographic information becomes available, etc.).

Additionally or alternatively, the cookie stitching server 120.1 may be configured to communicate with other computing devices, servers, databases, etc., that are not shown in FIG. 1 for purposes of brevity. In any event, embodiments include the cookie stitching server 120.1 identifying a user as she visits a retailer's website by identifying one or more different types of information that is received from the user's computing device, such as unique information identifying the user's currently-used computing device, cookie data, browsing data, etc., and then referencing a user record that contains that particular information, as the case may be. In this way, the cookie stitching server 120.1 may identify unique users and provide user records to the network server 120.2 regardless of which computing device is used to visit the retailer's website.

In various embodiments, the network server 120.2 may be configured as any suitable number and/or type of computing devices configured to host one or more retailer websites, which may include supporting, managing, arbitrating hosted content, etc. For example, the network server 120.2 may be configured to facilitate website hosting to provide hosted content to various computing devices in accordance with the embodiments described herein. Therefore, embodiments include network server being implemented as one or more servers, databases, data storage components, etc., which may include additional back-end components that are part of back-end components 120, or which may be separate from the back-end components 120 and not shown in FIG. 1 for purposes of brevity.

In embodiments, the network server 120.2 may be implemented as a web server and configured to support Internet communications with communication network 114 to facilitate communications with the various computing devices that navigate the retailer's hosted content, such as website content, for example. For example, the network server 120.2 may receive requests for access from various computing devices in the form of communications via an Internet protocol, and the network server 120.2 may provide a level of access to hosted content based upon the level of user authentication, or the type of information that may be identified, for each user. For example, the network server 120.2 may initially host a website session in accordance with a default signed-out state that only allows access to generic information, and does not allow the user to access sensitive or insensitive information until the user is identified in some manner. In this signed-out state, the user may be viewed as anonymous, and view other content provided by the retailer such as navigating the retailer's website, submitting requests for information, registering for a user profile or loyalty rewards account, etc.

The user may then be identified, for example, when the user provides authentication information via a computing device such as logon credentials. If these credentials are correct, the network server 120.2 may then transition the hosted session to a signed-in state, allowing the user to access other content, such as the aforementioned sensitive information, during that particular session. The network server 120.2 may continue to provide content during the session in accordance with the signed-in state until a particular trigger condition is satisfied, which causes the network server 120.2 to lapse either into a signed-off state or an intermediate state depending on whether the user can be identified after the trigger condition occurs.

For example, if the user closes a browser on the computing device, signs off the current session, or the session times out due to inactivity, the network server 120.2 may transition to a signed-off state. Alternatively, if the user (i.e., the user's computing device) can still be identified, the network server 120.2 may transition to an intermediate state. In other words, because the user cannot be definitively determined unless the authentication information is provided again, there is a high probability (although not a certainty), that the same user is navigating the website once signed out when the computing device does not change. As a result, this intermediate state may allow the user to access certain types of content provided by the network server 120.2 (e.g., insensitive information) but not others (e.g., sensitive information).

To do so, the network server 120.2 may be configured to place an encrypted cookie on the particular computing device (e.g., computing device 104.1) such that it may still be identified even when a user is signed-out. Continuing this example, as long as the user returns to the retailer's website using computing device 104.1, the network server 120.2 may decrypt this cookie to identify computing device 104.1, and assume that the same user (e.g., user 102.1) has returned to the retailer's website for a subsequent session. However, if the user 102.1 later accesses the retailer's website via another computing device (e.g., computing device 104.3), traditional web servers are incapable of associating this same user 102.1 with a different computing device.

Therefore, embodiments include the network server 120.2 being configured to communicate with one or more back-end components 120 and/or other computing devices as needed to determine that a user who is visiting the retailer's website from two or more different computing devices is likely the same user. For example, continuing the example above with respect to user 102.1, assume that the network server 120.2 transitions to a signed-out state for the user 102.1 when using computing device 104.1 during a first session. Then, during a subsequent session, the user 102.1 may navigate to the retailer's website using computing device 104.3, thereby requesting access to content hosted by the network server 120.2. Embodiments include the network server 120.2 being configured to communicate with cookie stitching server 120.1 to receive a notification indicating that the user 102.1 has likely returned to navigate the retailer's website and/or a user record associated with the user 102.1, which the network server may access to determine the user's Website ID, Account ID, demographic information, etc.

The network server 120.2 may then determine that the user navigating the retailer's website during the second session via computing device 104.3 is likely the same as the user who previously navigated the retailer's website via computing device 104.1 (i.e., user 102.1). Once this correlation is made, embodiments include the network server 120.2 providing content to this user based upon the type of information that may be included in the user record. For example, if the user record contains a Website ID (as is the case for the user record associated with Agency ID 123, as shown in FIG. 1), then the network server 120.2 may transition to the intermediate state as discussed above. This may occur even though the user 102.1 is requesting access from a different device than the computing device used for the first web session. In particular, embodiments include the network server 120.2 transitioning to the intermediate state during the second session without receiving any authenticating information from the user 102.1 via the computing device 104.3.

Again, the content that is provided to the user may be based upon the information found in the user record, which is further discussed below with reference to FIG. 2. To provide another example by modifying the details associated with the previous one, assume that user 102.3 first navigates the retailer's website via computing device 108.1 during a first session. Further assume that user 103.1 has not registered a user profile with the retailer, and therefore no Website ID exists for this particular user. However, the user record for user 102.3 (the user record for Agency ID 789) may contain other information that was provided during the first session or otherwise stored as part of the user record, such as the Account ID 963 that is associated with a loyalty rewards program, for example. This information may allow the user 102.3 to use the retailer's website for certain functions such as clipping digital coupons that are associated with the user's loyalty rewards account.

Thus, when the user 102.3 later navigates to the retailer's website via computing device 108.3 during a second session, embodiments include the network server 120.2 communicating with the cookie stitching server 102.1 to determine that user 102.3 is associated with both computing device 108.1 and computing device 108.3. The network server 120.2 may then receive a user record associated with the user 102.3 from the cookie stitching server 102.1. Because this particular user record lacks a Website ID, the network server 120.2 may instead save the Account ID 963 as part of the second session, allowing the user 102.3 to continue to clip digital coupons. In doing so, the network server 120.2 may store and/or associate the clipped digital coupons and/or perform other activities supported by the network server 120.2 using the Account ID 963. Furthermore, embodiments include the network server 120.2 allowing the user 102.3 to clip digital coupons during the second session using computing device 108.3 without receiving the loyalty rewards account number from the user.

To provide yet another example by modifying the details associated with the previous two, assume that user 102.4 first navigates to the retailer's website via computing device 110.1 during a first session. However, user 102.4 has not registered a user profile with the retailer, and therefore no Website ID exists for this particular user. Furthermore, this particular user lacks an Account ID. Continuing this example, the user 102.4 may later navigate to the retailer's website via computing device 110.2 during a second session. In this scenario, embodiments include the network server 120.2 communicating with the cookie stitching server 102.1 to determine that user 102.3 is associated with both computing device 110.1 and computing device 110.2. The network server 120.2 may then receive a user record associated with the user 102.4 from the cookie stitching server 102.1 (e.g., the user record associated with Agency ID 753).

Because this particular user record lacks both a Website ID and an Account ID, the network server 120.2 may save other types of information included in the user record for user 102.4 as part of the second session, such as contact information, demographic information, etc. In embodiments, the network server 120.2 may pre-fill form data in form fields included in content supported by the network server 120.2 with the user's respective information. This may function to assist the user 102.4 in performing various activities in which this information would otherwise need to be manually entered, such as website (i.e., user profile) registration, loyalty rewards program enrollment, etc. Additionally, embodiments include the network server 120.2 pre-filling the various form fields without receiving user input from the user 102.4.

In various embodiments, database server 120.3 may be implemented as any suitable number and/or type of servers that are configured to access data from database 120.4, which may store any suitable type of data as further discussed below.

In various embodiments, one or more of back-end components 120 may communicate with database 120.4 to store data to and/or to read data from database 120.4 as needed to facilitate the appropriate functions of the embodiments as described herein. Database 120.4 may be configured to store any suitable relevant data as described in the embodiments presented herein related to the operation of system 100. Such data may include, for example, user profile data that includes user information, payment information, contact information, demographic information, contact information, Website IDs, Account IDs, etc. Additionally or alternatively, database 120.4 may be configured to store the user records and/or data used to update the user records.

Furthermore, one or more back-end components 120 may store and/or access secure data that is of a private, proprietary, and/or sensitive nature. As a result, various embodiments of one or more back end components 120, communication network 114, and/or the computing devices implementing appropriate security protocols such as encryption, secure links, network authentication, firewalls, etc., to appropriately protect such secure data.

Figure 2:
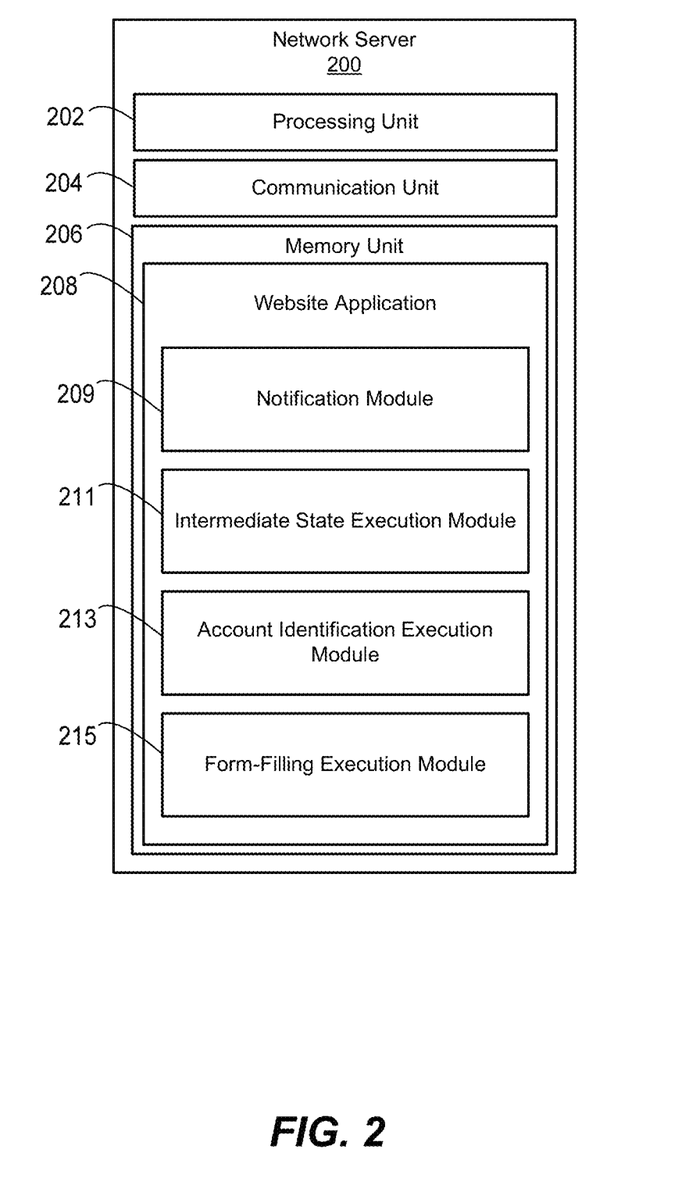
FIG. 2 is a block diagram of an example network server 200, in accordance with embodiments of the present disclosure.

FIG. 2 is a block diagram of an example network server 200, in accordance with embodiments of the present disclosure. In an embodiment, network server 200 may be an implementation of network server 120.2, for example, as shown in FIG. 1. In an embodiment, network server 200 may include a processing unit 202, a communication unit 204, and a memory unit 206. Network server 200 may include additional, fewer, or alternate components, including those discussed elsewhere herein.

Generally speaking, network server 200 may be configured to execute various installed applications to perform one or more functions of the embodiments as described herein. For example, network server 200 may be configured to execute a website application 208, which will be further discussed below. The website application 208 may be configured to enable network server 200 to perform various functions in conjunction with hardware components implemented by the network server 200, some of which may not be shown in FIG. 2 for purposes of brevity. For instance, the network server 200 may perform website hosting for one or more retailers or other entities, send and receive data via Internet communications (or other forms of communications) with other back-end components (e.g., cookie stitching servers such as those discussed with reference to FIG. 1) and/or send and receive data via Internet communications (or other forms of communications) with other various computing devices as they navigate to the retailer's website, control access to data provided as part of web hosting functionality during various web sessions, and allow users to navigate and otherwise interact with a retailer's website, as discussed herein.

To facilitate communications between the network server 200 and other computing devices and/or networks (e.g., the computing devices, communication network 114, and/or other back-end components 120 discussed above with respect to FIG. 1, etc.), communication unit 204 may be configured to support data communications in accordance with any suitable number and/or type of communication protocols. In various embodiments, communication unit 204 may be implemented with any suitable combination of hardware and/or software to facilitate this functionality. For example, communication unit 204 may be implemented with any suitable number of wired and/or wireless transceivers, network interfaces, physical layers (PHY), ports, antennas, etc.

Processing unit 202 may be implemented as any suitable type and/or number of processors, such as a host processor for the relevant device in which network server 200 is implemented, for example. Processing unit 202 may be configured to communicate with one or more of communication unit 204 and/or memory unit 206 to send data to and/or to receive data from one or more of these components, and/or to store data to and/or to read data from one or more of these components In accordance with various embodiments, memory unit 206 may be a computer-readable non-transitory storage device, and may include any suitable combination of volatile (e.g., a random access memory (RAM)), or a non-volatile memory (e.g., battery-backed RAM, FLASH, etc.). In an embodiment, memory unit 206 may be configured to store instructions executable by processing unit 202. These instructions may include machine readable instructions that, when executed by processing unit 202, cause processing unit 202 to perform various acts.

In an embodiment, website application 208 is a portion of memory unit 206 configured to store instructions, that when executed by processing unit 202, cause processing unit 202 to perform various acts in accordance with applicable embodiments as described herein. The various modules of website application 208 may represent portions of website application 208 that are associated with different functions. These portions may represent, for example, one or more algorithms, logic and code, executable instructions, programs, etc., to carry out specific tasks associated with the operation of website application 208, which are modularized in FIG. 2 for ease of explanation.

For example, notification module 209 may be a portion of memory unit 206 that, when executed by processing unit 202 in accordance with the website application 208, enables network server 200 to recognize when a user has returned to the retailer's website. For example, as discussed above, network server 200 may send an encrypted cookie to a particular computing device when that computing device accesses the retailer's website. If the user returns to the website later, the network server 200 may receive the encrypted cookie, decrypt it, and recognize the computing device using the decrypted cookie data.

However, if a user later returns to visit the retailer's website from a different computing device, instructions stored in notification module 209 may allow the network server 200, or a cookie stitching server in communication with the network server 200 (e.g., cookie stitching server 102.1, as discussed with reference to FIG. 1), to be notified accordingly such that the user (and/or information associated with the user) may be determined. In various embodiments, instructions stored in notification module 209 may enable notifications to be sent from either the network server 200 to a cookie stitching server, or vice versa, depending on the particular type of data monitoring implementation that is used.

For example, in "passive" data monitoring embodiments, instructions stored in notification module 209 may allow the network server 200 to initially attempt to identify a user by determining if the computing device is recognized (e.g., by determining whether an encrypted cookie is stored on the computing device). If the computing device cannot be recognized (e.g., because it is from a new and different computing device than that storing the encrypted cookie), these embodiments include the network server 200 sending a notification to the cookie stitching server. This notification may include, for example, a data flag and/or other information obtained via communication with the computing device used to currently navigate the retailer's website. For example, the information may include data such as other cookies stored on the computing device, a unique device identifier, browser information, etc. Further in accordance with such embodiments, the cookie stitching server may receive this information, use one or more portions of the information to correlate the computing device to a particular user record, and transmit the user record to the network server 200. Based upon the information contained in the user record, the network server 200 may provide varying levels of access and/or website functionality to the user, as further discussed herein.

To provide another example, in "active" data monitoring embodiments, instructions stored in notification module 209 may allow the network server 200 to receive and/or analyze data (e.g., user records) transmitted from the cookie stitching server (or other suitable back-end components). Continuing this example, a cookie stitching server may actively monitor web traffic to and/or from the retailer's website that is hosted by the network server 200, and/or actively communicate with computing devices visiting the retailer's website. In these scenarios, the cookie stitching server may actively receive similar information discussed above with respect to passive data monitoring without the back-end computing device 200 necessarily transmitting this information to the cookie stitching server. Again, this information may include other cookies stored on the computing device, a unique device identifier, browser information, etc.

Furthermore, once this information is obtained, the cookie stitching server may use one or more portions of the information to correlate the computing device currently navigating the retailer's website to a particular user record, and transmit the user record and/or a notification to the network server 200. In response to the received notification, the network server 200 may provide varying levels of access and/or website functionality based upon the information contained in the user record, as further discussed herein. In this way, active data monitoring embodiments may automatically provide the back-end computing device 200 with a user record for each user that visits the retailer's website. These embodiments may be particularly useful, for example, to prevent the back-end computing device 200 from unnecessarily expending processing resources by offloading processing to the cookie stitching server, thus conserving processing overhead.

In both active and passive data monitoring embodiments, user record information may be provided to the network server 200 in real time or near real time. For example, in passive data monitoring embodiments, the network server 200 may send notifications to, and receive user records from, the cookie stitching server upon the network server 200 determining that a particular computing device, and therefore a particular user, cannot be identified. Furthermore, in active data monitoring embodiments, the cookie stitching server may send user records and/or other data to the network server 200 upon the cookie-stitching server determining that a user visiting the retailer's website is associated with a particular set of computing devices, browser information, unique device identifiers, cookies, etc.

In an embodiment, intermediate state execution module 211 is a portion of memory unit 206 configured to store instructions, that when executed by processing unit 202, cause processing unit 202 to perform various acts in accordance with the applicable embodiments as described herein. In embodiments, these instructions may facilitate processing unit 202 determining when to transition to the aforementioned intermediate state during a web session, and causing the back-end component to do so for a particular user during a particular web session.

For example, as discussed above with reference to FIG. 1, a user from a particular computing device may access a website hosted by the network server 200 and, by default, be placed into a signed-out state until the user is identified in some way. For example, upon providing the correct authenticating information, the network server 200 may transition to a signed-in state. To provide another example, the instructions stored in intermediate state execution module 211 may enable the network server 200 to transition to an intermediate state if the user is identified to some degree. This may include, for example, the network server 200 reading a cookie that was stored on the user's computing device to assume that the same computing device, and therefore the same user, is still browsing the website.

However, embodiments also include the instructions stored in intermediate state execution module 211 enabling the network server 200 to identify the user via a user record received from the cookie stitching server, as discussed above with reference to the instructions stored in notification module 209 and elsewhere herein. To do so, the user needs to be associated with a particular identifier that can be recognized by the network server 200 for a current session. This may include, for example, the Website ID as discussed above with reference to FIG. 1. Continuing this example with reference to FIG. 1, users 102.1 and 102.2 have Website IDs included in their user records (i.e., user records for Agency IDs 123 and 456, as shown in FIG. 1). Therefore, once these users are identified, the instructions stored in intermediate state execution module 211 may enable the network server 200 to transition to the intermediate state without receiving additional information (e.g., authenticating information) from these users. When doing so, embodiments include the network server 200 saving the Website ID from a particular user record as part of the current session, correlating this Website ID to sensitive and insensitive information that is associated with that particular Website ID, and allowing a user to access the insensitive information but not the sensitive information during the intermediate state without receiving any authenticating information from the user.

But, as indicated by the user record data 140 in FIG. 1, not every user record may contain a Website ID (e.g., users 102.3), and therefore the network server 200 may not be able to transition to an intermediate state during a session for users associated with these user records, regardless of whether the user is identified via a cookie stored on a computing device or via the cookie stitching server. In other words, the network server 200 requires some form of unique user identification to associate a user with their sensitive and insensitive information, which cannot otherwise be made available to the user. However, as further discussed below, embodiments include the network server 200 providing other types of functionality during a session based upon other data contained in a user record even when a Website ID is not present.

To this end, account identification execution module 213 is a portion of memory unit 206 configured to store instructions, that when executed by processing unit 202, cause processing unit 202 to perform various acts in accordance with the applicable embodiments as described herein. In embodiments, these instructions may facilitate processing unit 202 determining when to store a user's account information when a user does not have a Website ID available. For instance, when the user does have a Website ID in the user record, the user may be associated with sensitive and insensitive information as discussed above, which may also include the user's account information (e.g., for user 102.1). Therefore, for users that only have an Account ID and not a Website ID (e.g., for user 102.3), the instructions stored in account identification execution module 213 may enable the network server 200 to save the Account ID from a particular user record (e.g., Agency ID 789 in this case) as part of the current session. Once saved, the network server 200 may allow the user access to various functionality that is available using this account information without receiving the account information from the user.

To provide an illustrative example, the user's Account ID may be associated with, or represent, a loyalty rewards account number. A loyalty rewards account number may be used to associate a virtually "clipped" coupon with a particular retailer promotion. This may include, for instance, a user selecting offers from the retailer's website via a computing device, scanning barcodes at physical retailer locations, etc. In doing so, the network server 200 may store the digital coupons in a manner that is linked to the user's loyalty rewards account number (e.g., in any suitable portion of memory unit 206 or another suitable location). Then, when presented at checkout within the website or at a physical store location, a user can redeem the offer by scanning their card number, which is then recognized by the network server 200 or other suitable computing device associated with the retailer to lookup stored coupons. Thus, the embodiments described herein allow instructions stored in account identification execution module 213 to enable the network server 200 to alternatively identify account information to still allow a user to store digital coupons during a session when a user Website ID does not exist for a particular user.

Of course, for users that have both a Website ID and an Account ID (e.g., for user 102.1) embodiments include the network server 200 transitioning to the intermediate state. In doing so, the Account ID may be part of the insensitive information for which the network server 200 allows the user to access to during the current session. Therefore, this functionality may additionally be available for users with both a Website ID and an Account ID.

However, as indicated by the user record data 140 in FIG. 1, some user records may not contain a Website ID or an Account ID, and therefore the network server 200 may not be able to transition to an intermediate state during a session or allow a user to clip digital coupons for users associated with these user records (e.g., for user 102.4). Therefore, form-filling execution module 215 is a portion of memory unit 206 configured to store instructions, that when executed by processing unit 202, cause processing unit 202 to perform various acts in accordance with the applicable embodiments as described herein.

In embodiments, these instructions may facilitate processing unit 202 determining when to store other types of information associated with a user record for a particular user and a particular session, and use this information to pre-fill form data. For instance, the user record for user 102.4 may still contain information that may be used to pre-fill or populate website form data fields, which would otherwise need to be entered manually by the user.

To provide an illustrative example, a user may interact with the website to register as a new user (resulting in a Website ID being generated) or to register for a loyalty reward account (resulting in an Account ID being generated). The user may also interact with the retailer's website in other ways, such as to fill out information request forms, to locate stores near the user, etc. In any event, the website may present the user with various form fields that are identified by the network server 200 as being associated with particular types of information such as a first name, a last name, an address, an email address, a phone number, etc. Embodiments include instructions stored in form-filling execution module 215 facilitating the network server 200 correlating data contained in a user record with these respective form fields, parsing data read from the user record, and/or filling in form fields with this information without receiving user input from the user.

Again, for users that have a Website ID (e.g., user 102.1) embodiments include the network server 200 transitioning to the intermediate state, and the information used to pre-fill form data may be part of the insensitive information that the network server 200 provides to the user in the intermediate state. Therefore, this functionality may additionally be available for users with a Website ID.

Figure 3:
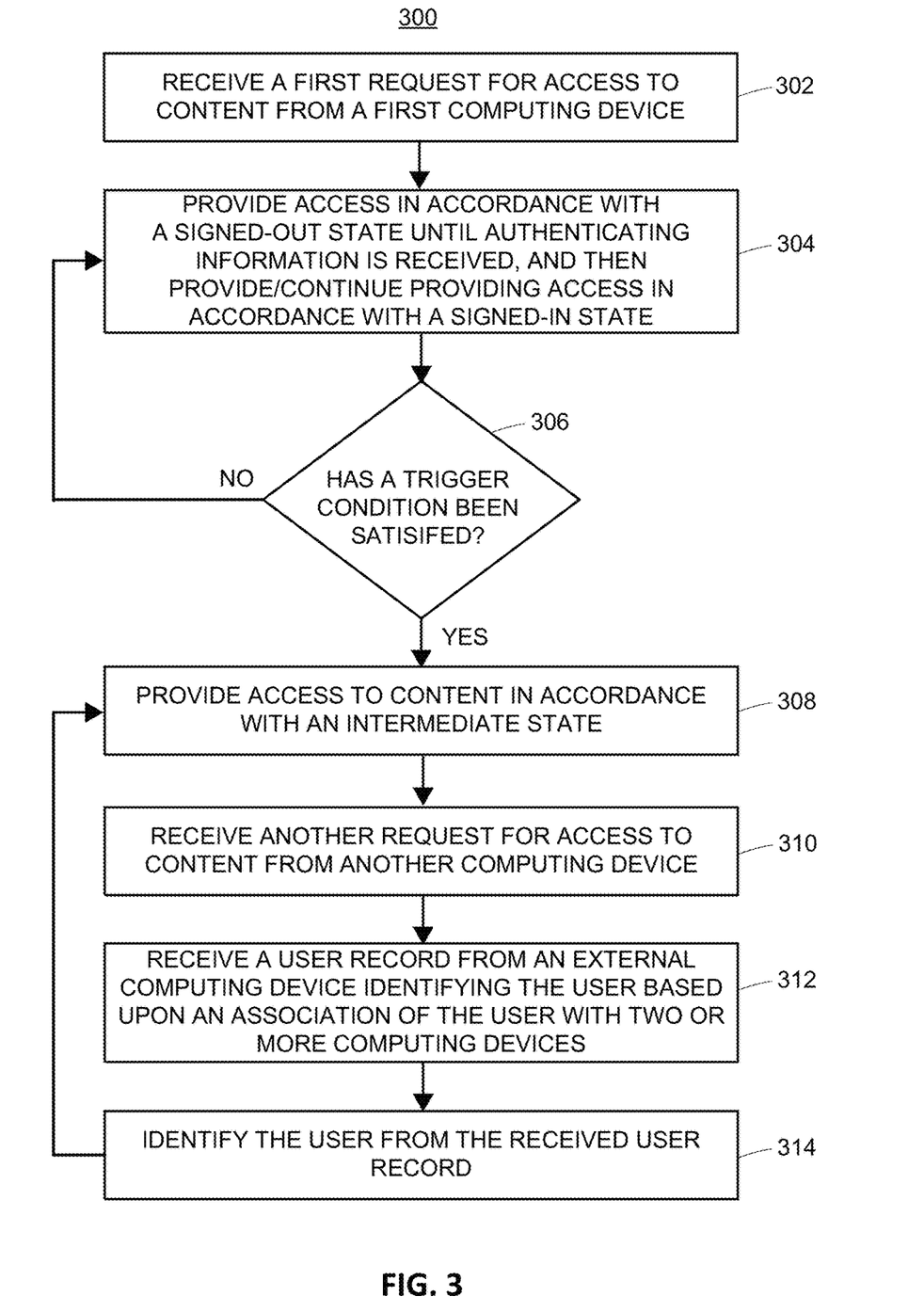
FIG. 3 illustrates a method flow 300, in accordance with embodiments of the present disclosure.

FIG. 3 illustrates a method flow 300, in accordance with embodiments of the present disclosure. In an embodiment, one or more portions of method 300 (or the entire method 300) may be implemented by any suitable device, and one or more portions of method 300 may be performed by more than one suitable device in combination with one another. For example, one or more portions of method 300 may be performed by network server 120.2 or network server 200, as shown in FIGS. 1 and 2. In an embodiment, method 300 may be performed by any suitable combination of one or more processors, applications, algorithms, and/or routines. For example, method 300 may be performed via processing unit 202 executing instructions stored in website application 208 and/or any modules contained therein, as shown and discussed with reference to FIG. 2.

Method 300 may start when one or more processors receive a first request for access to content via a first computing device (block 302). In an embodiment, this may include a user navigating to a retailer's website via a computing device, for example, resulting in the network server communicating with the first computing device and determining that the first computing is requesting access to content hosted by the network server (block 302). To provide an illustrative example with reference to FIG. 1, this may include user 102.1 visiting the retailer's website via computing device 104.1.

Method 300 may include one or more processors providing access to the hosted content in accordance with a signed-out state until authenticating information is received from a user, and then providing access to the hosted content in accordance with a signed-in state (block 304). In an embodiment, this may include the network server providing access, by default, to a user in accordance with a signed-out state until authenticating information is received and verified (block 304).

Method 300 includes one or more processors determining whether a trigger condition has been satisfied (block 306). This may include, for example, determining whether the user has closed a browser, the current session has timed out due to inactivity, or the user has signed out (block 306). If so, then method flow 300 may continue (block 308). Otherwise, method flow 300 may continue to provide access to hosted content in accordance with the signed-in state (block 304).

Method 300 may include one or more processors providing access in accordance with an intermediate state (block 308). Continuing the previous example with reference to FIG. 1, this may include the network server accessing computing device 104.1 to receive and decrypt a cookie that was initially stored on the computing device 104.1 during a previous visit to the retailer's website (block 302) to identify the computing device 104.1, and determine that the user is still likely user 102.1 (block 306). While in the intermediate state, the network server may then provide the computing device 104.1 with access to hosted content by providing access to insensitive information associated with the user's Website ID, but not sensitive information (block 308).

Method 300 may include one or more processors receiving a second request for access to content via another computing device (block 310). In an embodiment, this may include a user navigating to a retailer's website via a different computing device, for example, resulting in the network server communicating with the additional computing device and determining that the new computing device is requesting access to content hosted by the network server (block 310). Continuing the illustrative example with reference to FIG. 1, this may include user 102.1 subsequently visiting the retailer's website via computing device 104.2.

Method 300 may include one or more processors receiving data from an external computing device identifying the user based upon an association of the user with the two or more computing devices (e.g., computing devices 104.1 and 104.2) (block 312). This may include, for example, receiving a notification and/or other information associated with a user record from a cookie stitching server, as discussed herein (block 312). This information may be received, for example, in accordance with the active or the passive data monitoring embodiments as discussed above with reference to FIG. 2 (block 312).

Method 300 may include one or more processors identifying the user (block 314) based upon the received user record (block 312). This may include, for example, identifying a Website ID associated with the user contained in the user record (block 314). Continuing the illustrative example with reference to FIG. 1, this may include the network server identifying the user as one having Website ID 741 from the user record associated with the Agency ID 123. Once the user is identified (block 314), method flow 300 may include a transition to the intermediate state (block 308) such that insensitive information is provided to the user associated with Website ID 741. Although not shown in FIG. 3 for purposes of brevity, method flow 300 assumes that a Website ID exists for this particular user. However, in the case that a Website ID is not contained in the user record, then method flow 300 may terminate or otherwise proceed to using other information from the user record, as discussed below with reference to FIGS. 4 and 5. Furthermore, once the trigger condition has been satisfied (block 306), embodiments include method 300 repeatedly transitioning to the intermediate state for any new devices once a user record is correlated to this new computing device (blocks 308, 310, 312, 314).

Figure 4:
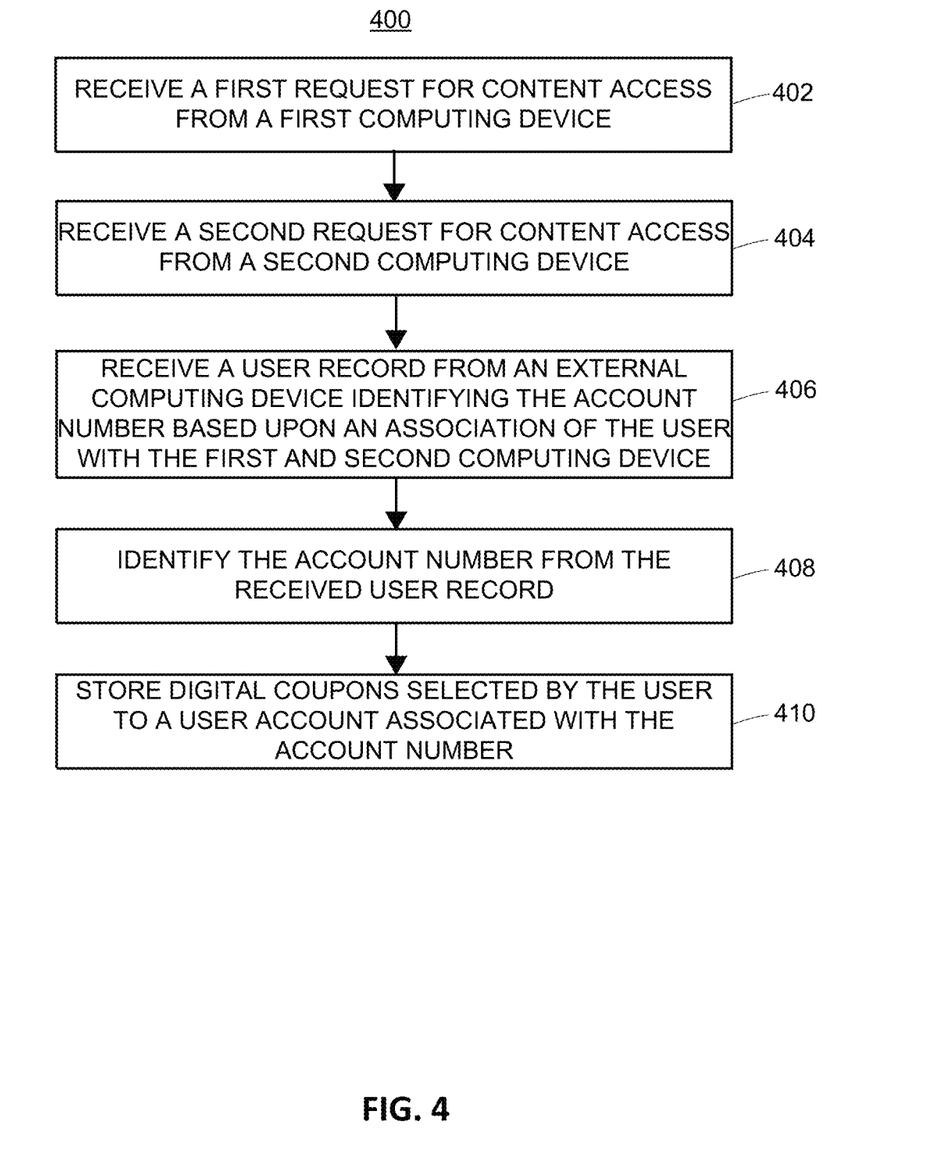
FIG. 4 illustrates a method flow 400, in accordance with embodiments of the present disclosure.

FIG. 4 illustrates a method flow 400, in accordance with embodiments of the present disclosure. In an embodiment, one or more portions of method 400 (or the entire method 400) may be implemented by any suitable device, and one or more portions of method 400 may be performed by more than one suitable device in combination with one another. For example, one or more portions of method 400 may be performed by network server 120.2 or network server 200, as shown in FIGS. 1 and 2. In an embodiment, method 400 may be performed by any suitable combination of one or more processors, applications, algorithms, and/or routines. For example, method 400 may be performed via processing unit 202 executing instructions stored in website application 208 and/or any modules contained therein, as shown and discussed with reference to FIG. 2.

Method 400 may start when one or more processors receive a first request for access to content from a first computing device (block 402). In an embodiment, this may include a user navigating to a retailer's website via a computing device, for example, resulting in the network server communicating with the first computing device and determining that the first computing is requesting access to content hosted by the network server (block 402). To provide an illustrative example with reference to FIG. 1, this may include user 102.3 visiting the retailer's website via computing device 108.1.

Method 400 may include one or more processors receiving a second request for access to content from a second computing device (block 404). In an embodiment, this may include a user navigating to a retailer's website via a different computing device, for example, resulting in the network server communicating with the second computing device and determining that the second computing is requesting access to content hosted by the network server (block 404). Continuing the illustrative example with reference to FIG. 1, this may include user 102.3 subsequently visiting the retailer's website via computing device 108.2.

Method 400 may include one or more processors receiving data from an external computing device identifying the user based upon an association of the user with the first and the second computing device (block 406). This may include, for example, receiving a notification and/or other information associated with a user record from a cookie stitching server, as discussed herein (block 406). This information may be received, for example, in accordance with the active or the passive data monitoring embodiments as discussed above with reference to FIG. 2 (block 406).

Method 400 may include one or more processors identifying the user's account number based upon the received data (block 408). This may include, for example, identifying an Account ID associated with the user using the received user record (block 408). Continuing the illustrative example with reference to FIG. 1, this may include the network server identifying the account number as one associated with Account ID 963 (which may be the same as the account number or a different identifier) from the user record associated with the Agency ID 789 for user 102.3.

Once the account number is identified (block 408), method flow 300 may continue to allow a user to store digital coupons selected by the user in a manner that the digital coupons are linked to the account number (block 410).

Figure 5:
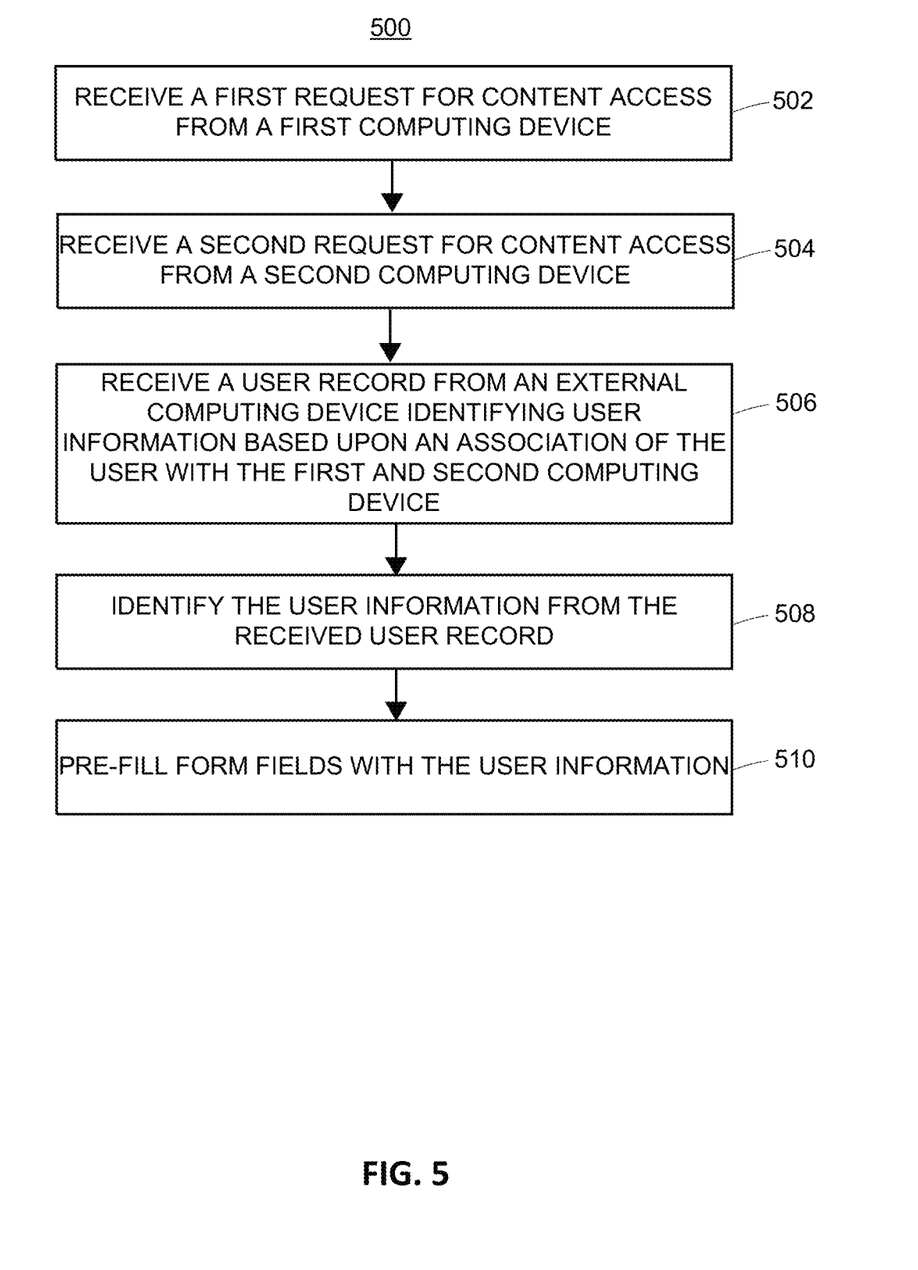
FIG. 5 illustrates a method flow 500, in accordance with embodiments of the present disclosure.

FIG. 5 illustrates a method flow 500, in accordance with embodiments of the present disclosure. In an embodiment, one or more portions of method 500 (or the entire method 500) may be implemented by any suitable device, and one or more portions of method 500 may be performed by more than one suitable device in combination with one another. For example, one or more portions of method 500 may be performed by network server 120.2 or network server 200, as shown in FIGS. 1 and 2. In an embodiment, method 500 may be performed by any suitable combination of one or more processors, applications, algorithms, and/or routines. For example, method 500 may be performed via processing unit 202 executing instructions stored in website application 208 and/or any modules contained therein, as shown and discussed with reference to FIG. 2.

Method 500 may start when one or more processors receive a first request for access to content from a first computing device (block 502). In an embodiment, this may include a user navigating to a retailer's website via a computing device, for example, resulting in the network server communicating with the first computing device and determining that the first computing is requesting access to content hosted by the network server (block 502). To provide an illustrative example with reference to FIG. 1, this may include user 102.4 visiting the retailer's website via computing device 110.1.

Method 500 may include one or more processors receiving a second request for access to content via a second computing device (block 504). In an embodiment, this may include a user navigating to a retailer's website from a different computing device, for example, resulting in the network server communicating with the second computing device and determining that the second computing is requesting access to content hosted by the network server (block 504). Continuing the illustrative example with reference to FIG. 1, this may include user 102.4 subsequently visiting the retailer's website via computing device 110.2.

Method 500 may include one or more processors receiving a user record from an external computing device identifying user information based upon an association of the user with the first and the second computing device (block 506). This may include, for example, receiving a notification and/or other information associated with a user record from a cookie stitching server, as discussed herein (block 506). This information may be received, for example, in accordance with the active or the passive data monitoring embodiments as discussed above with reference to FIG. 2 (block 506).

Method 500 may include one or more processors identifying the user information based upon the received user record (block 508). This user information may include, for example, demographic and/or contact information such as a name, an email an address, a residential address, etc. (block 508). Continuing the illustrative example with reference to FIG. 1, this may include the network server identifying the information associated with the Agency ID 753 for user 102.4.

Once the user information is identified (block 508), method flow 500 may continue to pre-fill form fields on the website with the information obtained via the user (block 510).

Technical Advantages

The embodiments described herein may be implemented as part of one or more computer components, such as a computing devices and/or one or more back-end components. Furthermore, the embodiments described herein may be implemented as part of a computer network architecture that facilitates communications between various other devices and/or components. Thus, the embodiments described herein address and solve issues of a technical nature that are necessarily rooted in computer technology.

For instance, embodiments include cross-identifying users and user information when visiting a website from different computing devices at different times by leveraging cookie stitchers. Using this process, a user's Website ID may be identified, allowing a network server to transition a web session to an intermediate state and provide the user with access to insensitive information without requesting additional information from the user. Without the improvements suggested herein, a user could not be identified when accessing the same website from a different computing device, and therefore the user would need to re-enter authenticating information to gain access to insensitive information. Additionally, by providing users with access to other types of data on a website once a user record is found, the embodiments leverage an interaction between various back-end components in a manner that achieves results that could not be otherwise be achieved manually, or otherwise.

Additionally, the embodiments described herein allow for user information to be identified from within a user record. In doing so, the embodiments not only provide users with a greater level of convenience, but also address issues related to processing and resource usage by the network server hosting the website. For example, by allowing a website to recognize user information, a network server may advantageously utilize less processing resources and time by off-loading the user identification to other back-end components and/or by not requiring authenticating information to be re-entered. Therefore, the embodiments also help address issues related to controlling processing resources and regulating power usage.

Additional Considerations

For ease of explanation, the disclosure may generally refer to specific components as performing the various calculations and other functions implemented by the embodiments described herein. However, it will be understood that any suitable function described herein is not limited to the particular component for which its functionality is described.

As used herein, the term "store," or "retailer" may include, for example, a single outlet or a plurality of outlets affiliated with one or more entities that are licensed or otherwise authorized to sell merchandise, to dispense prescribed pharmaceutical products such as drugs, medicaments, durable medical equipment, etc. The one or more entities may be located, for example, in geographic locations separate from one another, in different areas of the same city, or in different states, countries, etc. The retail stores may include, for example, one or more of a conventional retail store, space within a location operated by another commercial or not-for-profit entity (e.g., within a discount store, hospital, school, nursing home, etc.), an outlet in proximity with a warehouse or distribution center, a call-in pharmacy, a long-term care pharmacy, a workplace/on-site pharmacy, a specialty pharmacy, etc. The pharmacy may be commercial or not-for-profit, and may provide or vend other products in addition to the prescribed pharmaceutical products.

Although the foregoing text sets forth a detailed description of numerous different embodiments, it should be understood that the detailed description is to be construed as exemplary only and does not describe every possible embodiment because describing every possible embodiment would be impractical, if not impossible. In light of the foregoing text, one of ordinary skill in the art will recognize that numerous alternative embodiments could be implemented, using either current technology or technology developed after the filing date of this patent application.

What is claimed is:

1. A computer-implemented method in a network server, comprising:

receiving, by the network server from a first computing device, a first request for access to content by a user, the content being provided by the network server and including generic, sensitive, and non-sensitive information;

providing, by the network server, access to the generic content in accordance with a signed-out state until authenticating information is received via the first computing device, and then further providing access to the sensitive and non-sensitive information in accordance with a signed-in state;

upon a trigger condition being satisfied, transitioning, by the network server, from the signed-in state to an intermediate state to provide access to the non-sensitive information while preventing access to the sensitive information;

receiving, by the network server from a second computing device, a second request for access to content by the user, wherein a cookie-stitching server accesses data that correlates a plurality of users to a set of respective computing devices to determine that the user is associated with the first computing device and the second computing device;

receiving in real time, by the network server, a user record for the user when it is determined that the user is associated with the first computing device and the second computing device;

in response to receiving the user record, identifying, by the network server, the user based upon the received user record; and upon identifying the user, transitioning, by the network server, from the signed-out state to the intermediate state to provide access to the non-sensitive information.

2. The computer-implemented method of claim 1, wherein the user record is sent to the network server by a cookie-stitching server.

3. The computer-implemented method of claim 1, wherein the cookie-stitching server determines that the user is associated with the first computing device and the second computing device using one or more of (i) cookie data, (ii) unique device identifiers, and (iii) browser information.

4. The computer-implemented method of claim 1, wherein the user record is provided by the cookie-stitching sever when the cookie-stitching server determines that the user is associated with at least one of: the first computing device or the second computing device.

5. The computer-implemented method of claim 1, wherein the act of identifying the user includes identifying a website identifier (ID) associated with the user.

6. The computer-implemented method of claim 1, wherein the act of transitioning from the signed-out state to the intermediate state is performed without receiving the authenticating information via the second computing device.

7. A computer-implemented method in a network server, comprising:

receiving, by the network server from a first computing device, a first request for access to content that is provided by the network server, the user having a loyalty rewards account;

receiving, by the network server from a second computing device, a second request for access to the content that is provided by the network server, the second request being made subsequent to the first request;

receiving in real time, by the network server, a user record for the user when it is determined that the user is associated with the first computing device and the second computing device, wherein a cookie-stitching server determines that the user is associated with the first computing device and the second computing device using one or more of (i) cookie data, (ii) unique device identifiers, and (iii) browser information;

in response to receiving the user record, identifying, by the network server, a loyalty rewards account number associated with the user's loyalty rewards account using the received user record; and upon identifying the loyalty rewards account number, storing digital coupons, selected by the user via the second computing device, to the user's loyalty rewards account.

8. The computer-implemented method of claim 7, wherein the act of storing digital coupons is performed without receiving the loyalty rewards account number via the second computing device.

9. The computer-implemented method of claim 7, wherein the user record is sent to the network device by the cookie-stitching server.

10. The computer-implemented method of claim 7, wherein the cookie-stitching server accesses data that correlates a plurality of users to a set of respective computing devices to determine that the user is associated with the first computing device and the second computing device.

11. The computer-implemented method of claim 7, wherein the user record is provided by the cookie-stitching sever when the cookie-stitching server determines that the user is associated with at least one of: the first computing device or the second computing device.

12. The computer-implemented method of claim 7, wherein the user record includes information associated with the user provided by the cookie stitching server, and wherein the act of identifying the loyalty rewards account number includes identifying the loyalty rewards account number from within the user record.

13. A computer-implemented method in a network server, comprising:

receiving, by the network server from a first computing device, a first request for access to content that is provided by the network server, the user being associated with user information;

receiving, by the network server from a second computing device, a second request for access to the content that is provided by the network server, the second request being made subsequent to the first request;

receiving in real time, by the network server, a user record for the user when it is determined that the user is associated with the first computing device and the second computing device, wherein the user record is sent to the network server by a cookie-stitching sever when the cookie-stitching server determines that the user is associated with at least one of: the first computing device or the second computing device;

in response to receiving the user record, identifying, by the network server, the user information; and upon identifying the user information, pre-filling, by the network server, form fields with the user information.

14. The computer-implemented method of claim 13, wherein the act of pre-filling the form fields is performed without receiving user input via the second computing device.

15. The computer-implemented method of claim 13, wherein the user record is provided by the cookie-stitching server.

16. The computer-implemented method of claim 13, wherein the cookie-stitching server accesses data that correlates a plurality of users to a set of respective computing devices to determine that the user is associated with the first computing device and the second computing device.

17. The computer-implemented method of claim 13, wherein the cookie-stitching server determines that the user is associated with the first computing device and the second computing device using one or more of (i) cookie data, (ii) unique device identifiers, and (iii) browser information.

\* \* \* \* \*